United States Patent
Trapp et al.

(10) Patent No.: US 6,997,605 B2
(45) Date of Patent: Feb. 14, 2006

(54) DEVICE FOR DETECTION OF THE TEMPERATURE IN THE INTERIOR OF A VEHICLE

(75) Inventors: Ralph Trapp, Paderborn (DE); Bernd Stich, Bueren (DE); Otto Knittel, Soest (DE); Marwin Hamann, Lippstadt (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 0 days.

(21) Appl. No.: 10/797,904

(22) Filed: Mar. 10, 2004

(65) Prior Publication Data

US 2004/0223534 A1    Nov. 11, 2004

(30) Foreign Application Priority Data

Mar. 12, 2003  (DE)  ................ 103 11 297
Oct. 31, 2003  (DE)  ................ 103 50 915

(51) Int. Cl.
G01K 1/20 (2006.01)
G01K 1/16 (2006.01)
G01K 1/14 (2006.01)

(52) U.S. Cl. ................ 374/172; 374/141; 374/208
(58) Field of Classification Search ................ 374/141, 374/208, 120, 121, 133, 135, 172, 129; 236/12, 236/91 E, 91 C; 702/130; 73/866.5
See application file for complete search history.

(56) References Cited

U.S. PATENT DOCUMENTS

| | | | |
|---|---|---|---|
| 4,434,932 A * | 3/1984 | Hara et al. ................ 236/49.3 |
| 4,867,574 A * | 9/1989 | Jenkofsky ................ 374/121 |
| 4,881,822 A * | 11/1989 | Ridenour ................ 374/109 |
| 5,220,805 A * | 6/1993 | Fukudomi ................ 62/126 |
| 5,400,964 A * | 3/1995 | Freiberger ................ 236/91 C |
| 5,518,176 A * | 5/1996 | Turner et al. ................ 236/49.3 |
| 5,547,125 A * | 8/1996 | Hennessee et al. ........ 236/49.3 |
| 5,793,044 A * | 8/1998 | Mace et al. ................ 250/343 |
| 5,860,593 A * | 1/1999 | Heinle et al. ............. 236/91 C |
| 6,070,650 A * | 6/2000 | Inoue et al. ................ 165/42 |
| 6,155,492 A * | 12/2000 | Hinterwaller et al. ........ 236/51 |
| 6,185,950 B1 * | 2/2001 | Baruschke et al. ........... 62/244 |
| 6,202,934 B1 * | 3/2001 | Kamiya et al. ............ 236/91 C |
| 6,206,299 B1 * | 3/2001 | Mann et al. ................ 239/69 |
| 6,357,909 B1 * | 3/2002 | Watanabe ................ 374/131 |
| 6,435,711 B1 * | 8/2002 | Gerlitz ................ 374/130 |

(Continued)

FOREIGN PATENT DOCUMENTS

FR    2694083 A1 *  1/1994

*Primary Examiner*—Gail Verbitsky
(74) *Attorney, Agent, or Firm*—Shumaker & Sieffert, P.A.

(57) ABSTRACT

The device for detection of the temperature in the interior of a vehicle, particularly for an air-conditioning system of a vehicle, is provided with an interior temperature sensor (28) arranged in a housing (18) arranged in or at a wall (12) adjacent to the interior (14) of the vehicle and being at least partially adjacent to the interior (14) of the vehicle, and a radiation sensor (30) detecting solar radiation leading to the heating of the housing (18) of the interior temperature sensor (28). Further, the device is provided with a compensation temperature sensor (36) arranged behind the wall (12) and such that it is thermally decoupled from the interior temperature sensor (28) and detecting the heat of air and/or assemblies behind the wall (12), which leads to a falsification of the measured value of the interior temperature sensor (28). The two temperature sensors (28,36) and the radiation sensor (30) are combined in a common assembly.

13 Claims, 3 Drawing Sheets

U.S. PATENT DOCUMENTS

Figure 1:
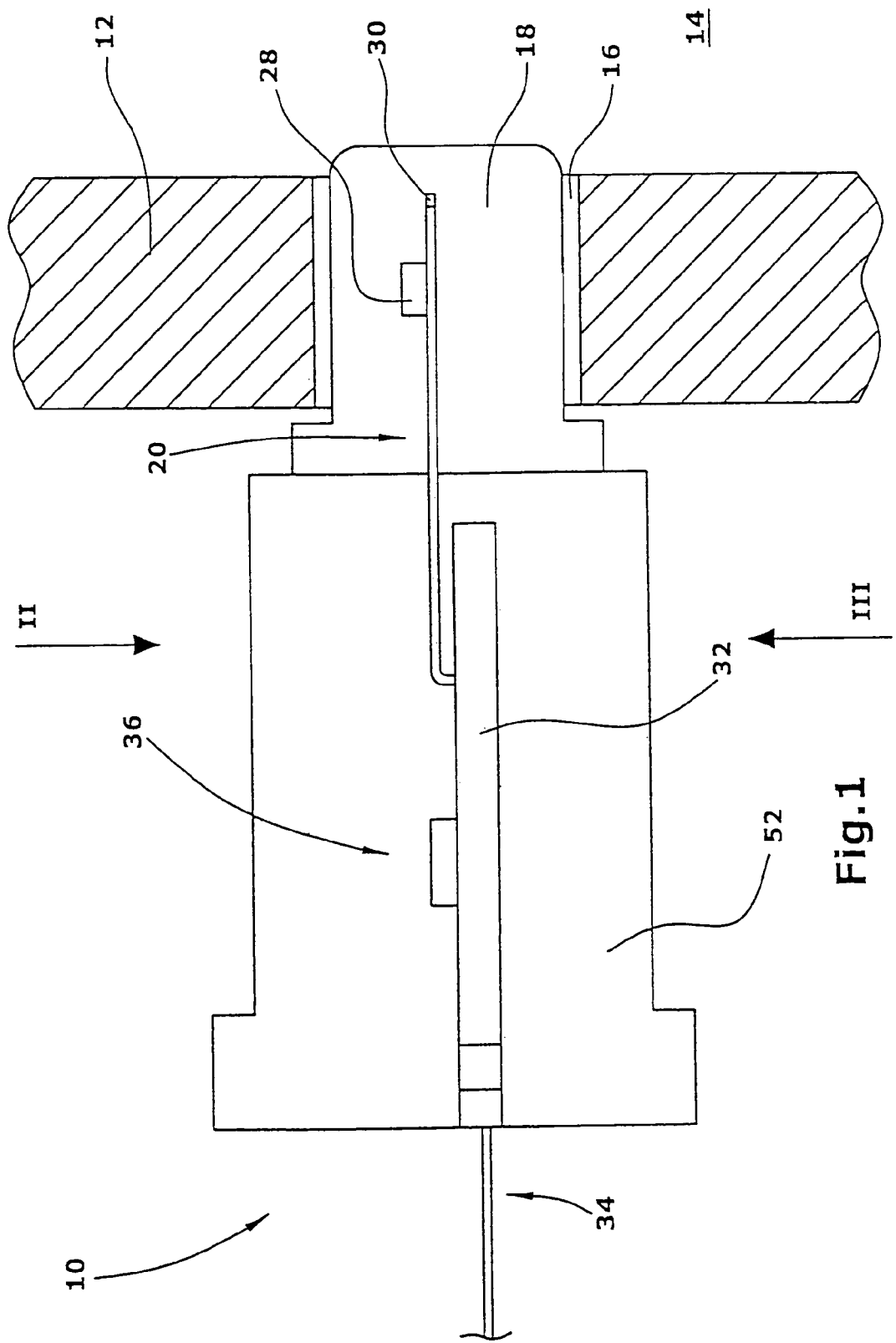

| | | | |
|---|---|---|---|
| 6,575,378 B2 * | 6/2003 | Aoki et al. | 236/49.3 |
| 6,619,556 B1 * | 9/2003 | Snider et al. | 236/49.3 |
| 6,709,155 B2 * | 3/2004 | Knittel et al. | 374/141 |
| 6,843,424 B2 * | 1/2005 | Weber et al. | 236/49.3 |
| 2002/0048308 A1 * | 4/2002 | Knittel et al. | 374/141 |
| 2002/0110178 A1 * | 8/2002 | Puranen et al. | 374/121 |
| 2004/0104279 A1 * | 6/2004 | Weber et al. | 236/49.3 |
| 2004/0151229 A1 * | 8/2004 | Ruettiger | 374/121 |

* cited by examiner

DEVICE FOR DETECTION OF THE TEMPERATURE IN THE INTERIOR OF A VEHICLE

The invention relates to a device for detection of the temperature in the interior of a vehicle, particularly for an air-conditioning system of a vehicle.

Presently, in the field of vehicle air-conditioning, the temperature of the air in the interior of a vehicle is measured by a forced aeration system consisting of an aeration motor and a temperature sensor. The aeration motor typically mounted in the air-conditioning controller takes in the air of the interior of the vehicle and leads it to the temperature sensor through an intake channel.

The temperature sensor is thermally isolated from the printed circuit board and other components of the controller in order to avoid interfering influences. The forced convection through the aeration motor causes that the temperature sensor detects the air of the incoming air from the vehicle interior. This system has several disadvantages: the motor is a movable part and thus affected by wear, it produces disturbing noise and takes in particles from the interior, which may lead to that the sensor is soiled and possibly blocks the intake channel.

From DE 100 49 979 A1, a device for measuring the interior temperature in a vehicle without the use of an aeration motor is known. There, an additional temperature sensor performs a compensation measurement. The compensation temperature sensor is arranged relatively far away from the actual interior temperature sensor.

It is an object of the invention to provide a device for calculating the interior temperature without forced aeration of a sensor where thermal influence values can be effectively compensated.

To solve this object, the invention suggests a device for detection of the temperature in the interior of a vehicle, particularly for an air-conditioning system of a vehicle, which is provided with

- an interior temperature sensor arranged in a housing which is arranged in or at a wall adjacent to the interior of the vehicle and being at least partially adjacent to the interior of the vehicle,
- a radiation sensor detecting solar radiation leading to the heating of the housing of the interior temperature sensor, and
- a compensation temperature sensor arranged behind the wall and such that it is thermally decoupled from the interior temperature sensor and detecting the heat of air and/or assemblies behind the wall which leads to a falsification of the measured value of the interior temperature sensor,
- the two temperature sensors and the radiation sensor being combined in a common assembly.

In the device for detection of the temperature in the interior of a vehicle according to the invention, an interior temperature sensor is located such in front of, at or in a wall adjacent to the interior of the vehicle such that the interior temperature sensor is in thermal contact with the air in the interior of the vehicle. The interior temperature sensor itself may be arranged in a housing and is embedded in a casting material, particularly as a NTC or PTC component. Behind the wall, a compensation temperature sensor is located which is thermally decoupled from the interior temperature sensor and detects interfering thermal influences that may be produced behind the wall. This may be caused, for example, by the self-heating of operating units or vehicle components such as the controller of an air-conditioning system in particular. Via a radiation sensor, thermal influences directly and indirectly produced by the solar irradiation, affecting the measured signal of the interior temperature sensor, are detected. The two temperature sensors are combined in an assembly, hence, they are arranged on a common printed circuit board or another carrier or mounting board.

By arranging the compensation temperature sensor such that it is decoupled from the interior temperature sensor and nevertheless in the region of the interior temperature sensor, it is achieved that all those temperature influences are detectable which have an effect upon the interior temperature sensor output signal and are not caused by the temperature of the air in the interior of the vehicle. Thus, the output signal of the interior temperature sensor can be compensated much more exactly which is advantageous for an exact interior temperature measurement and consequently, for a precise control of the interior temperature. Moreover, it is possible to take into account the compensation of the thermal influence values that act upon the interior temperature sensor independent of the vehicle type since the compensation is solely proportionated to the signal of the compensation temperature sensor. Typically, other influence values can be neglected. When the radiation sensor is arranged as close as possible to the interior temperature sensor, the thermal influences caused by the solar irradiation can also be calculated and considered solely from the signal of the radiation sensor. It is particularly suitable if the radiation sensor is arranged in the housing of the interior temperature sensor.

In an advantageous embodiment of the invention, it is further provided that the compensation temperature sensor is thermally connected with at least one heat-conducting surface arranged behind the wall. This heat-conducting surface is preferably arranged on a mounting board, a printed circuit board, for example. The object of the heat-conducting surface is the "capturing" of heat and particularly of convection heat as it is produced by air movements behind the wall, for example. Preferably, several heat-conducting surfaces are provided. If these heat-conducting surfaces are arranged on both surfaces of the mounting board, they are suitably thermally coupled among each other which, for example, is effected via throughplatings like they are known from the layout of printed circuit boards. Preferably, at least one heat-conducting surface or at least a pair of heat-conducting surfaces arranged on both surfaces of the mounting board is arranged on each of the two sides of the compensation temperature sensor.

The thermal decoupling of the two temperature sensors is preferably effected by a corresponding wiring or arrangement of conducting tracks on the mounting board carrying both temperature sensors. If, for example, the conducting tracks for the energy supply of both temperature sensors are configured in a meandering manner, the shape of a S or waved in a different manner, a thermal decoupling occurs because of the implied prolongation of the electric connections. The thermal decoupling of the entire assembly via the leads thereof can also be effected in the above-described manner. Additionally or alternatively, however, special electric lines may also be used the thermal conductivity of which is bad although their electric conductivity is good.

In an advantageous embodiment of the invention, it is further provided that the pins of the interior temperature sensor and the conducting tracks on the mounting board as well as the compensation temperature sensor are enclosed by a casting mass serving the thermal insulation with respect to the environment and the mechanical fixing.

Figure 2:
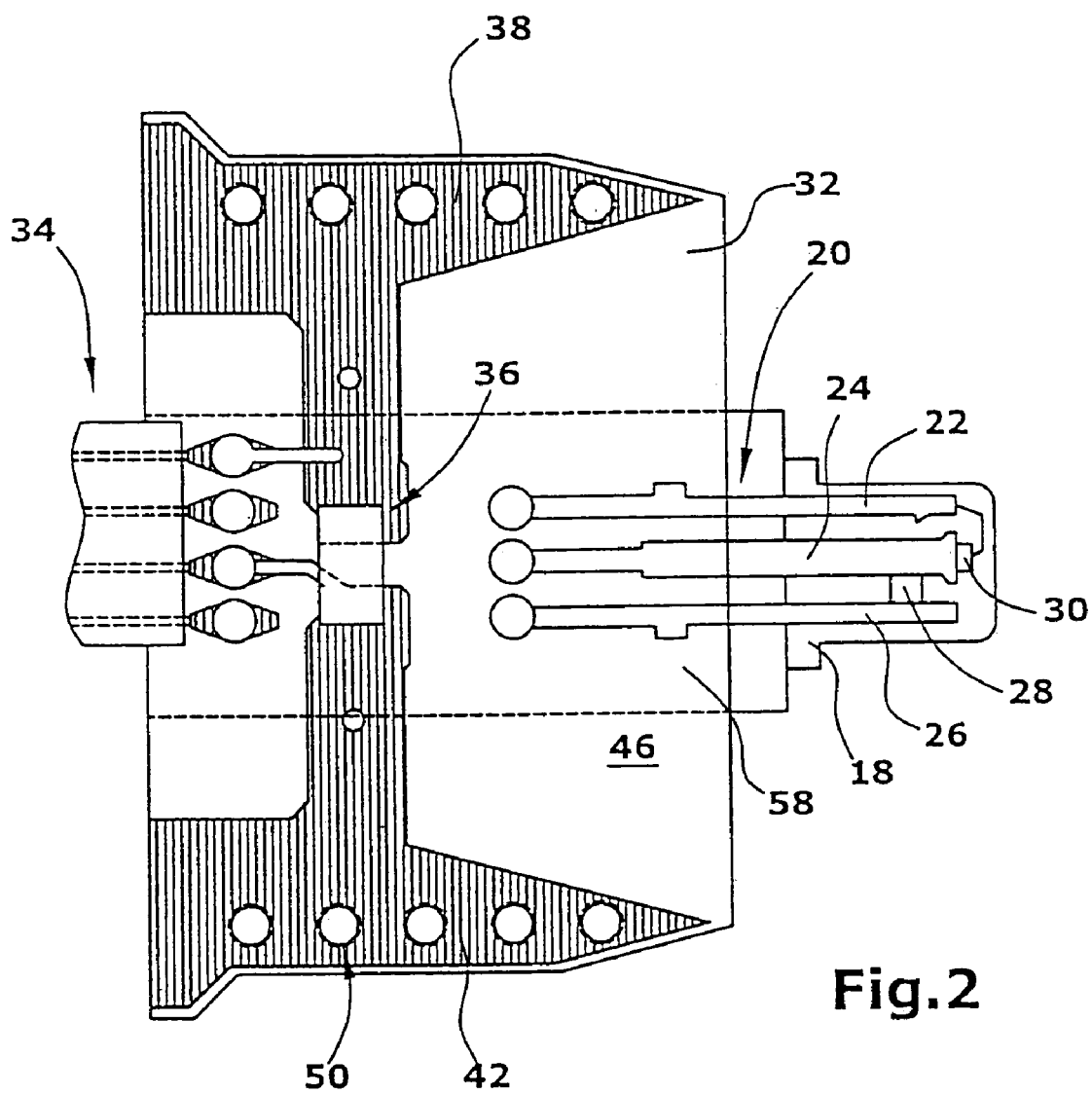
Figure 3:
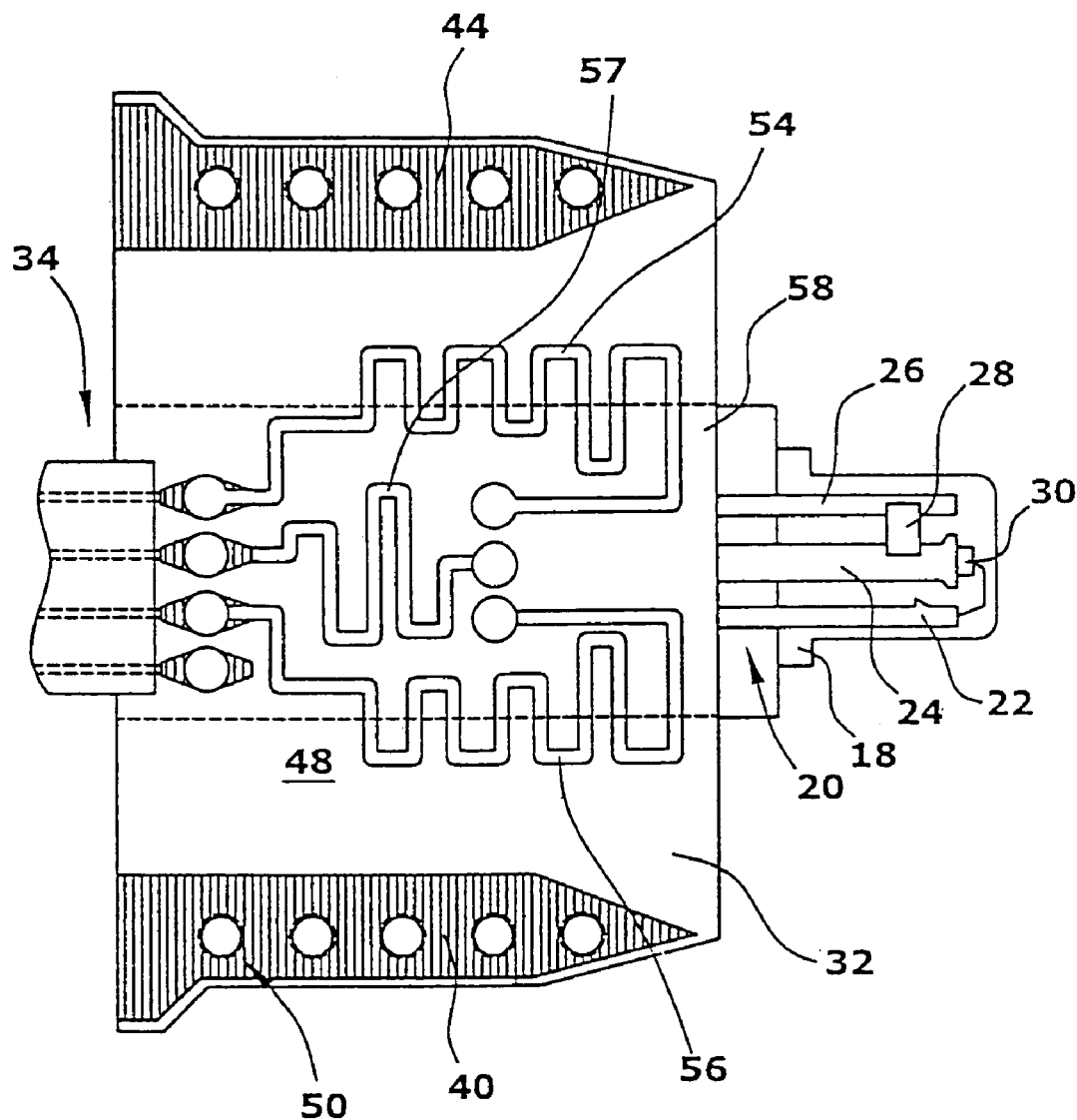

Hereinafter, the invention is explained in detail with reference to the drawing. In the Figures:

FIG. 1 is a side view of an embodiment of the device according to the invention in the state of being built in in an air-conditioning system controller, FIG. 2 is a view onto the assembly in the direction of the arrow II of FIG. 1 in the state of not being built in, and FIG. 3 is a view onto the assembly in the direction of the arrow III of FIG. 1 in the state of not being built in.

FIG. 1 shows a preferred embodiment of a device 10 according to the invention, for detection of the temperature in the interior of a vehicle in the built-in state. At 12, a wall adjacent to the interior 14 is illustrated, which, for example, is the front cover of the operating unit of a vehicle air-conditioning system. The wall 12 comprises an opening 16 in which a housing 18 of a component of the device 10 is arranged. The housing 18 includes a lead frame 20 with three pins 22,24,26 serving the electric contacting of an interior temperature sensor 28 and a radiation sensor 30 (see also FIGS. 2 and 3). In this embodiment, the interior temperature sensor 28 is a NTC resistor element while the radiation sensor 30 is configured as a photodiode.

As can be seen in the Figs., the lead frame 20 is soldered to a printed circuit board 32 to which a multiwire electric lead 34 leads. A compensation temperature sensor 36 electrically connected with the lead 34 and thermally connected with several heat-conducting surfaces 38,40 and 42,44 is located on the printed circuit board 32. These heat-conducting surfaces extend on both sides of the compensation temperature sensor 36, two of the heat-conducting surfaces being arranged on the upper main surface 46 of the printed circuit board 32 and the two other heat-conducting surfaces being arranged on the lower main surface 48 of the printed circuit board 32, respectively. The heat-conducting surfaces 38 and 40 as well as 42 and 44 are respectively connected among each other in pairs, which is effected via through-platings 50 that are metallized through holes extending through the printed circuit board 32 and thermally connecting the heat-conducting surfaces of each pair of heat-conducting surfaces among each other.

As can be further seen from FIG. 3 in particular, the conducting tracks 52,54,56 on the printed circuit board 32 are prolonged by a waved configuration in this case so that a thermal decoupling of the two temperature sensors among each other and with respect to the electric lead 34 is achieved. The printed circuit board 32 and the lead frame 20 are enclosed by a casting mass 58, which is only partially the case with respect to the printed circuit board 32, namely in the middle portion between the pairs of heat-conducting surfaces.

The device according to the invention permits the measurement of the interior temperature without the aforementioned disadvantages. The device comprises three sensors that have a fixed geometric and thermal relation among each other, i.e., the interior temperature sensor projecting into the vehicle interior and measuring the temperature of the air, the radiation sensor measuring the incident radiation intensity impinging onto the interior temperature sensor, and the compensation temperature sensor detecting the thermal energy influencing the interior temperature sensor via the mounting or the housing. The measured value of the interior temperature sensor is falsified by heat introduced by the controller and/or by the housing. Direct solar irradiation impinging onto the first temperature sensor also has an interfering influence. These interfering influences, however, are detected by the additional sensors and thus, they can be computationally compensated. Typically, this happens in the air-conditioning controller.

The particularity of the device according to the invention consists in the arrangement and thermal coupling of the three sensors. The two temperature sensors are thermally decoupled from each other. Their connection contacts and lines are also thermally decoupled from the wiring of the temperature sensors. The ambient heat of the compensation temperature sensor is Acaptured@ via heat-conducting surfaces that are in thermal contact with the compensation sensor. The pins and conducting tracks leading to the three sensors are embedded in a casting mass; this also applies to the compensation temperature sensor but not to the heat-conducting surfaces. The assembly comprising the three sensors can be arranged outside the operating unit of the air-conditioning system.

LIST OF REFERENCE NUMERALS 10 device
12 wall to the vehicle interior
14 interior
16 opening
18 housing
20 frame
22 pins
24 pins
26 pins
28 interior temperature sensor
30 radiation sensor
32 printed circuit board
34 multiwire electric lead
36 compensation temperature sensor
38 heat-conducting surfaces
40 heat-conducting surfaces
42 heat-conducting surfaces
44 heat-conducting surfaces
46 upper main surface
48 main surface
50 throughplatings
52 casting mass
58 casting mass

What is claimed is:

1. Device for detection of the temperature in the interior of a vehicle, comprising
an interior temperature sensor arranged in a housing arranged in or at a wall adjacent to the interior of the vehicle, the interior temperature sensor being at least partially adjacent to the interior of the vehicle,
a radiation sensor detecting solar radiation leading to the heating of the housing of the interior temperature sensor, and
a compensation temperature sensor arranged behind the wall and such that it is thermally decoupled from the interior temperature sensor, the compensation temperature sensor detecting the heat of air and/or assemblies behind the wall which influences a measured value of the interior temperature sensor,
the two temperature sensors and the radiation sensor being combined in a common assembly.

2. Device according to claim 1, characterized in that the two temperature sensors and the radiation sensor are held by a common mounting plate.

3. Device according to claim 1, characterized in that the compensation temperature sensor is thermally connected with at least one heat conducting surface arranged behind the wall.

4. Device according to claim 2, characterized in that heat-conducting surfaces are arranged on at least one surface of the mounting plate at both sides of the compensation temperature sensor.

5. Device according to claim 4, characterized in that heat-conducting surfaces are arranged on both surfaces of the mounting plate at both sides of the compensation temperature sensor, the heat-conducting surfaces respectively opposite on the two surfaces of the mounting plate being thermally connected with each other by means of through-platings extending through the mounting plate.

6. Device according to one of claims 1 to 5, characterized in that the electric connection of the interior temperature sensor and/or the radiation sensor is/are thermally insulated.

7. Device according to one of claims 1 to 5, characterized in that the housing of the interior temperature sensor comprises electric pins and the assembly comprises electric conducting tracks, and that the electric pins and the conducting tracks are embedded, at least partially, by a casting mass for the purpose of thermal insulation and mechanical fixing.

8. Device according to one of claims 1 to 5, characterized in that the assembly is arranged outside an operating and/or controlling apparatus of a vehicle air-conditioning system.

9. Device according to claim 2, characterized in that the compensation temperature sensor is thermally connected with at least one heat conducting surface arranged behind the wall.

10. Device according to claim 3, characterized in that head-conducting surfaces are arranged on at least one surface of the mounting plate at both sides of the compensation temperature sensor.

11. Device according to claim 6, characterized in that the housing of the interior temperature sensor comprises electric pins and the assembly comprises electric conducting tracks, and that the electric pins and the conducting tracks are embedded, at least partially, by a casting mass for the purpose of thermal insulation and mechanical fixing.

12. Device according to claim 6, characterized in that the assembly is arranged outside an operating and/or controlling apparatus of a vehicle air-conditioning system.

13. Device according to claim 7, characterized in that the assembly is arranged outside an operating and/or controlling apparatus of a vehicle air-conditioning system.

\* \* \* \* \*